Feb. 14, 1939.   V. CRANFORD   2,147,010
SIGNALING DEVICE
Filed Dec. 27, 1937   3 Sheets-Sheet 1
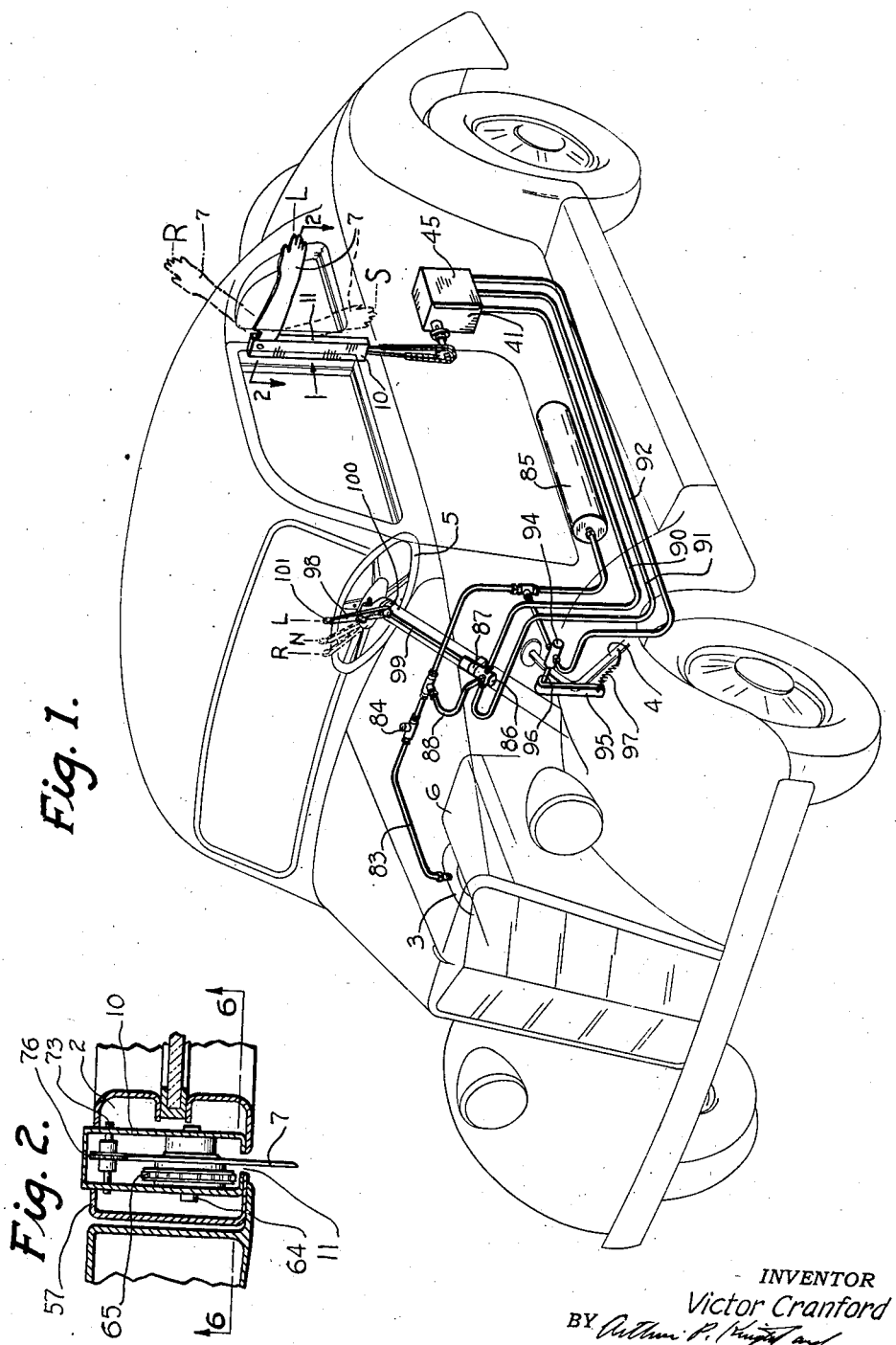
INVENTOR
*Victor Cranford*
BY
ATTORNEYS Feb. 14, 1939.  V. CRANFORD  2,147,010
SIGNALING DEVICE
Filed Dec. 27, 1937   3 Sheets-Sheet 2
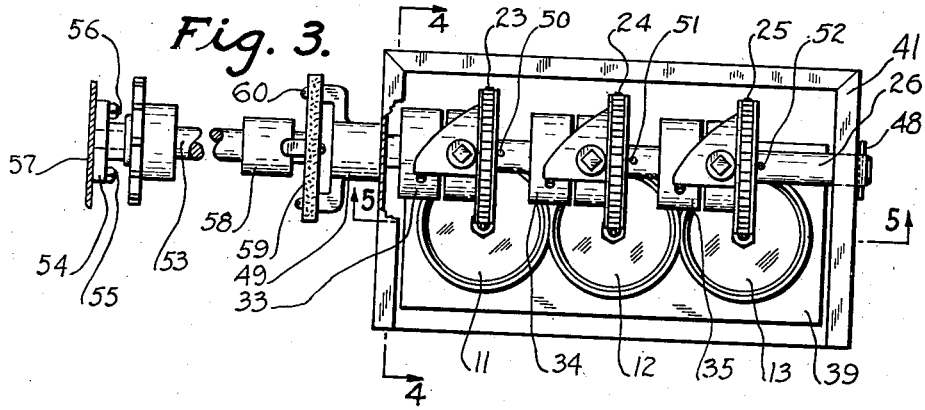
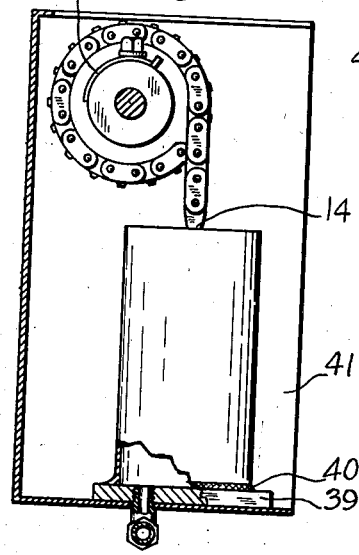
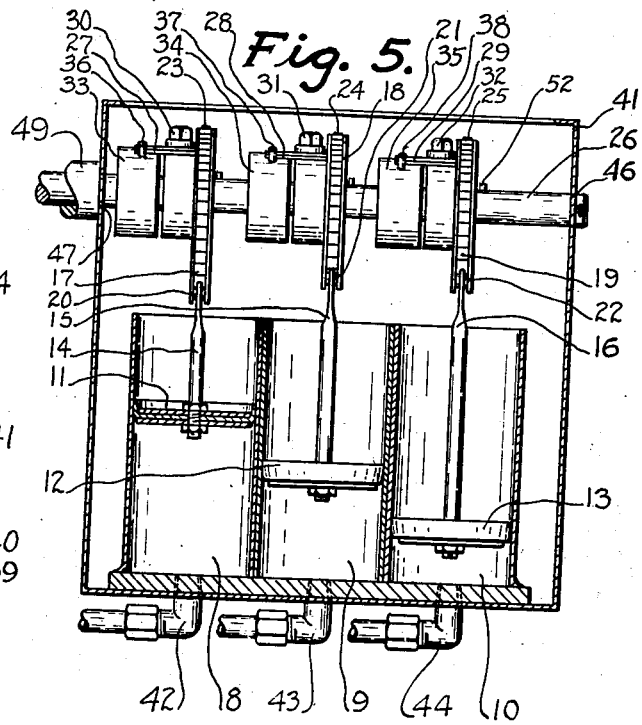
INVENTOR
Victor Cranford
BY
ATTORNEYS Feb. 14, 1939.  V. CRANFORD  2,147,010
SIGNALING DEVICE
Filed Dec. 27, 1937  3 Sheets—Sheet 3
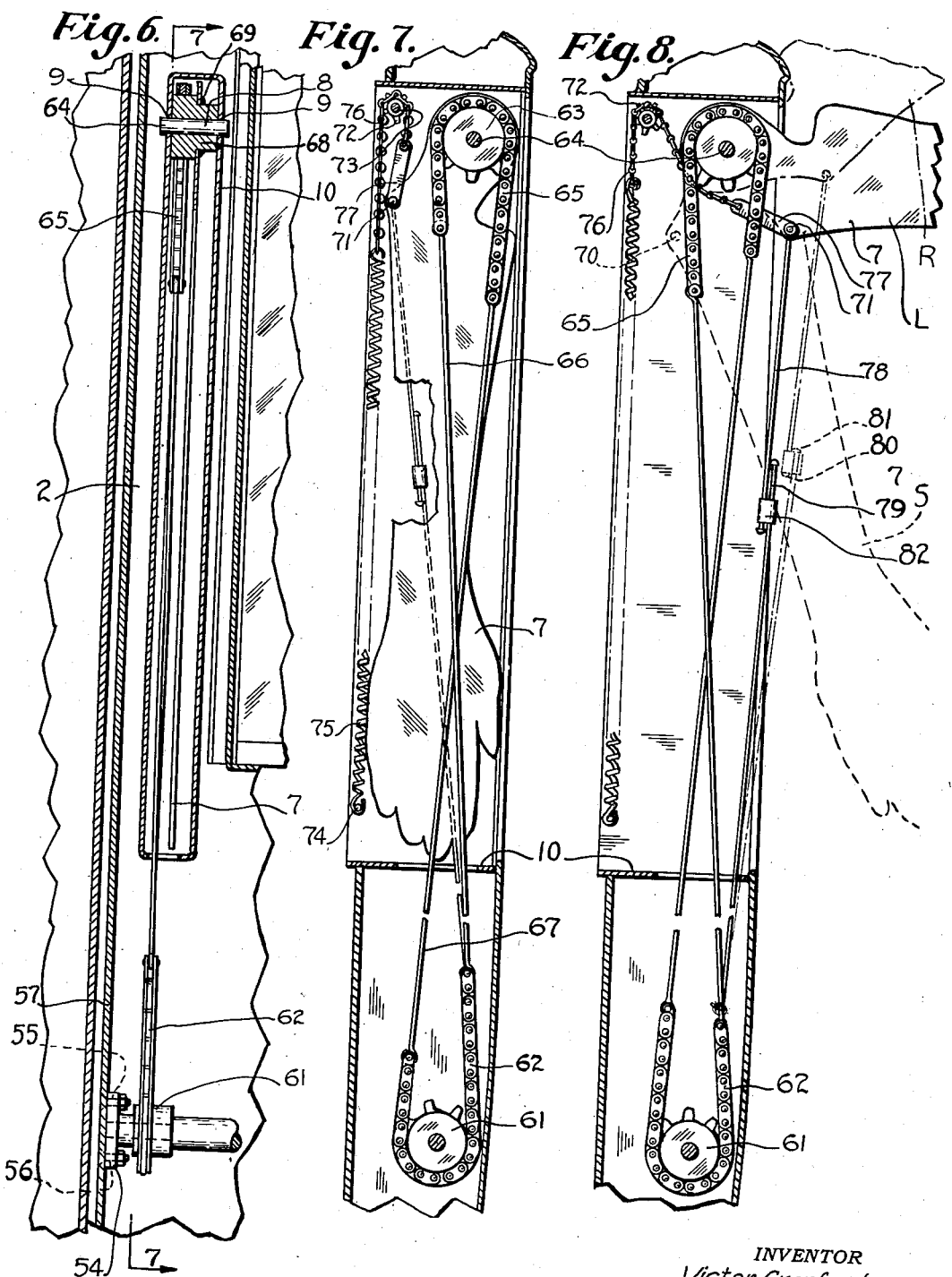
INVENTOR
Victor Cranford,
BY
ATTORNEYS Patented Feb. 14, 1939

2,147,010

UNITED STATES PATENT OFFICE 2,147,010

SIGNALING DEVICE

Victor Cranford, San Fernando, Calif.

Application December 27, 1937, Serial No. 181,826

5 Claims. (Cl. 116—39)

This invention relates to signaling devices for vehicles, such as automobiles, trucks, trains, street-cars, boats, and the like, and particularly to a signal device for indicating a contemplated change in course of such a vehicle, references herein to "change in course" of a vehicle being understood to include both a change in direction or a change in speed, such as a right turn, left turn, slowing or stopping.

One of the particular objects of the invention is to provide a signal device adapted for use on an enclosed vehicle, and which in signaling position projects outwardly from the vehicle body into view but which when in non-signaling position is retracted within the vehicle body.

A further object of the invention is to provide a signal device provided with an advantageous operating mechanism adapted to provide a rapid movement of the signaling element to signaling position and including a self-contained arresting member adapted to arrest the movement of such element when the signaling position is reached.

A further object of the invention is to provide a signal device adapted for selective operative association with a plurality of operating members, whereby a single signaling element is employed to establish any one of a plurality of visual signal indications, in response to the independent operation of one of said operating members.

A further object of the invention is to provide a signaling device for a motor vehicle provided with an internal combustion engine, which is associated with the intake manifold of such internal combustion engine in such manner that the reduced pressure in such manifold is employed to effect operation of the device from non-indicating position to indicating position, and to cause the same to persist in such position, responsive to the setting of valve means under control of the operator of such vehicle.

The device of the present invention may comprise a semaphore arm pivotally mounted for movement about a horizontal axis between a plurality of signal-indicating positions, and operating means associated with said semaphore arm to cause movement thereof between such positions, said semaphore arm being preferably disposed within the body portion of the vehicle with which the device is associated in such manner as to be substantially concealed from view when in non-indicating position, and to move into view into the respective signal indicating positions. The operating means preferably comprises a plurality of vacuum-responsive cylinder means provided with piston elements operatively connected with the semaphore arm, suitable valve means being provided for associating a particular one of said cylinders with the vacuum supply to cause movement of the semaphore arm into the desired signal indicating position. Suitable control means for such valve means are also provided, such as that shown in my copending application, Ser. No. 23,560, filed May 27, 1935, now Patent No. 2,103,247. This application is an improvement of the aforesaid application, and pertains particularly to the semaphore and semaphore operating means with which such a control device may be used.

Other objects and features of the invention will be brought out in the following description of a preferred embodiment thereof, as shown in the accompanying drawings, and referring thereto:

Fig. 1 is a phantom view of an automobile provided with a signal means according to this invention;

Fig. 2 is a transverse sectional detail thereof, taken on line 2—2 in Fig. 1, showing how the semaphore arm means may be disposed within the body structure of the vehicle;

Fig. 3 is a plan view of a form of vacuum actuated operating means useful for effecting the desired movement of the semaphore member;

Fig. 4 is a transverse vertical section thereof taken on line 4—4 in Fig. 3;

Fig. 5 is a longitudinal vertical section thereof, taken on line 5—5 in Fig. 3;

Fig. 6 is a vertical section of the semaphore means, taken on line 6—6 in Fig. 2, showing the semaphore in non-indicating position;

Fig. 7 is a vertical section thereof taken on line 7—7 in Fig. 6; and

Fig. 8 is a view corresponding to that shown in Fig. 7, with the signal arm shown in the same signal-indicating position indicated in Fig. 1, with alternative signal-indicating positions being shown in dot-dash lines.

Referring to Fig. 1 of the drawings, I designates a concealed signaling device mounted in the side of an automobile, usually in a hollow space 2 provided in the frame and side construction thereof, and as shown in the specific embodiment herein illustrated, I may operate said signal device by suction preferably from the intake manifold 3 of the automobile engine. The operation of the signal device is automatically controlled by valve mechanism working in conjunction with a foot brake lever 4, hand lever means located adjacent the automobile steering wheel 5 and engine 6.

The signal indicator and the direct operating means therefor may comprise a semaphore arm 7 mounted on a shaft 8, journaled on bearings 9 formed in a casing 10 provided with a slot 11 in the forward face thereof through which said arm may extend in signal indicating position. It will be apparent from consideration of these figures, that the arm 7 is adapted to assume any desired position with respect to the vertical, to indicate the vehicle operator's intended change in the operation of the vehicle. Three arm signals are customarily employed in automobile operation; the operator generally indicating a contemplated stop or deceleration by extending his left arm (assuming a left-hand driven vehicle) in a downwardly inclined position; a left turn by extending the left arm horizontally outward, and a right turn by extending the arm in an upwardly inclined position. These positions are indicated in Figs. 1 and 8 at R, L, and S respectively. It will be appreciated that in any locality where custom has established signal indications other than the above, the associated parts of the present described mechanism may be re-associated in their correct relation to the desired signals.

The operating means for the semaphore arm 7 may comprise a plurality of vacuum-operated cylinders 8, 9, and 10, provided with pistons 11, 12, and 13 respectively as shown in Fig. 5, three separate cylinders and pistons are provided for the three described signal positions, and in order to raise a semaphore arm 7 to the required distance or elevation to indicate the desired signal, I so arrange the length of the piston rods 14, 15, and 16, so that the respective pistons 11, 12, and 13 are disposed at different distances from the bottom of the respective cylinders. The right-turn indicating position R requires the greatest downward movement, and the piston 11 is thus placed near the top of the cylinder 8. The left-turn signal requires less downward movement and the piston 12 is thus placed at a lower position within the cylinder 9 than the corresponding piston 11. Similarly, the piston 13 which provides the signal for stopping or deceleration of the vehicle is provided with a relatively short stroke, as by being positioned near the bottom of the cylinder 10.

The piston rods 14, 15, and 16 are secured to chain belts 17, 18, and 19 by means of journals 20, 21, and 22, respectively. The chain belts wrap around and mesh with sprocket wheels 23, 24, and 25 which are carried by and freely rotatable on a rotatable shaft 26. Rigidly mounted on the center or hub portion of the respective sprockets are outwardly disposed driving arms 27, 28, and 29 being held securely in position by means of screw bolts 30, 31, and 32 respectively. Onto shaft 26, collars 33, 34, and 35 are tightly and non-rotatably pressed or keyed into their respective operating positions, each collar being provided with stop pins 36, 37, and 38 which may engage with the driving arms 27, 28, and 29.

The cylinders 8, 9, and 10 are mounted securely, preferably on a rectangular base 39, usually being welded in position to effect an airtight mounting as at 40, although the cylinders may be made integrally with and including the base portion such as of cast iron or the like. 41 designates a metallic case usually mounted in a convenient and inconspicuous space which may be provided interiorly of or below the body of the automobile, preferably adjacent the side portion thereof. To the bottom of the case 45, the base 39 may be anchored by utilizing suction line elbows 42, 43, and 44. A case cover 45 serves to enclose the top and one side of the case.

Journals 46 and 47 are provided in the form of apertures in the end walls of case 41 for the shaft 26. 48 designates a pin preferably the split type and maintains longitudinal positioning of the shaft in the case in association with a coupling 49 which is non-rotatably mounted on the opposite extremities of the shaft 26. Pins 50, 51, and 52 are also provided in the shaft and are adapted to maintain longitudinal alignment of the sprocket wheels 23, 24, and 25 respectively.

A rotatable shaft 53 may be mounted in a journal 54, the journal being bolted to a suitable portion of the automobile construction by means of bolts 55 and 56 respectively, preferably to an upright strut or door pillar designated by the numeral 57. A coupling member 58 is non-rotatably mounted on one extremity of the shaft 53, usually being pressed tightly into position. Interposed between the adjacent faces of coupling members 49 and 58, a flexible coupling disc 59 is employed to transmit rotation from shaft 26 to shaft 53. A plurality of screws 60 are employed to bolt the disc securely in operative position.

A lower sprocket wheel 61 is non-rotatably mounted on the shaft 53, and a chain belt 62 is wrapped around and meshed with the sprocket wheel 61. An upper sprocket wheel 63 is journaled on a shaft 64 and is rotatably mounted in the side walls of casing 10. A chain belt 65 is wrapped around and meshed with sprocket wheel 63. I provide a tension rod 66, which is pivotally secured at one end to the inner extremity of chain belt 65, and to the outer extremity of belt 62. An associated tension rod 67 is provided, the upper end of which is pivotally connected to the outer extremity of the chain belt 65 and the lower end is pivotally secured to the inner extremity of chain belt 62. The lengths of the respective rods are such as to create a slight tension on the respective chain belts, this feature being more clearly illustrated in Figs. 7 and 8 of the drawings. Onto the hub portion 68 of the sprocket wheel 63, the semaphore arm 7 is non-rotatably secured in position in the present instance by electric welding as at 69. An aperture 70 is provided in the arm 7, into which a pivot pin 71 is journaled. A sprocket wheel 72 is rotatably mounted preferably in the upper portion of casing 10 by means of journal shaft 73 which is rotatably mounted in the walls of case 10. Into a side wall of the case 10 an anchor 74 is rigidly mounted to which one extremity of a tension spring 75 is secured. A chain belt 76 is wrapped around and meshed with the sprocket wheel 72, one end link in the said chain belt being secured to the upper extremity of the tension spring 75, and the end link on the opposite end of the chain being pivotally attached to one extremity of a connecting bar 77, the said bar being pivotally mounted at its opposite extremity to the pivot pin 71. To prevent over-travel in the right turn or R position of the semaphore arm 7, I provide stops or rods 78 and 79 which are interposed between and secured to the pivot pin 71, and to the outer extremity of the chain belt 62. Heads 80 and 81 are provided on the inner extremities of their respective rods and serve as abutments or stops when associated with a twin sleeve member 82 which is slidably disposed on the rods 78 and 79, this being comparable to a solid link or rod, when the predetermined maximum travel of the semaphore arm 7 has been reached at which point the heads 80 and 81 engage tightly against the sleeve 82, as is clearly illustrated in dot-dash lines in the R position of Fig. 8 of the drawings. When the semaphore 7 is in the R position, or has reached the extreme point of upward movement, the chain belt 76 has wrapped around the arcuate end portion of the semaphore. The tension spring 75 sets up a constant torque load on the hub and arm portion of the arm 7, thereby causing an instantaneous and accelerated return of the arm toward normal or non-indicating position.

The vacuum or suction power is obtained from the suction of the automobile engine and in the present instance through the medium of the intake manifold 3, the connection 83 being attached thereto.

To prevent loss of vacuum in the vacuum system, a suitable check valve 84 may be provided in the connection 83. A vacuum reserve tank 85 is provided and is usually mounted on the underside of the automobile in any convenient and advantageous location. To establish communication between the vacuum supply lines and the cylinders 8, 9, and 10 a distributor valve 86 is provided and may be mounted on a steering column bracket 87. A connection 88 is interposed between the distributor valve 86 and the main supply line 83. Connections 90 and 91 respectively establish communications between the distributor valve 86 and cylinders 8 and 9, and 92 designates a connection to cylinder number 10.

Automatic operation of the "stop" signal or the S position in Figs. 1 and 8 may be provided by means of a control valve 94 which is actuated by means of an arcuate arm 95 pivotally mounted on a rotatable shaft 96 which is associated with the control valve 94. A suitable tension spring 97 is provided to bias the arcuate arm 95 against the foot lever 4. When the foot lever is depressed to operating position, the arcuate arm 95 will be actuated and assume a position that will open a port in the control valve 94, thereby establishing a suction communication in the cylinder 10.

The control means for operating the distributor valve 86 comprises a suitable movable manual lever 98 which is non-rotatably mounted on a short shaft 99 pivotally secured to and journaled in the steering column bracket 87 at its lower journal portion, and to a steering column bearing 100 at its upper journal portion. The lever 98 is preferably provided with a projecting end portion 101 for engagement by the hand of the operator.

A control means including the lever 98 may correspond to the control means shown more particularly in Figs. 1 through 4 of the above-mentioned copending application Ser. No. 23,560, in which case an automatic return of the valve means to neutral position is secured when the desired turning movement is completed by the vehicle. It will be appreciated that fully manual control means may be employed in the present invention, wherefore the valve means 86 is placed in position to connect the proper cylinder 8 or 9 with the suction supply lines to cause the semaphore arm to raise to the L or R position by a manual movement, and a succeeding manual movement is employed to return the valve means 86 to neutral position at the will of the operator. In Fig. 1 the manual lever 98 is shown in full line position such as to cause the signal means to move to the delineated L signal position, and the neutral position and right-hand signal position are shown in dot-dash lines.

In the operation of the invention, the operator of the automobile sets the lever 98 prior to making a right-hand turn, which opens the distributor valve for establishing power suction communication to the cylinder 8 from the intake manifold and vacuum reserve tank 85. With the suction force applied, the piston 11 quickly responds and travels substantially to the bottom of the cylinder; the movement of the piston rod 14 in turn causes the movement of the driving arm 27 into engagement with stop pin 36, thereby rotating shafts 26, 53, and 64 through the chain belts, 62 and 65, thereby imparting sufficient movement to raise the semaphore arm 7 to the R position indicated by the dot-dash lines in Fig. 8.

Operation of semaphore for the left or L position will be understood to be comparable to the above except the distributor valve 86 establishes vacuum communication with cylinder 9 instead of with cylinder 8.

When the lever 98 is in a neutral or central position and braking action is applied to the foot lever 4, the arcuate arm 95 automatically actuates the control valve 94 and establishes suction communication in the connection leading to the cylinder 10. The action of the piston and associated members in raising the semaphore arm 7 to the stop or S position is comparable to the movements described herein for the "right" turn.

The return movement of the semaphore arm is automatic in action as the arcuate arm 95 follows the pedal movement thereby setting the control valve 94 to a neutral position which would permit atmospheric pressure to enter the ports and connection 92 which leads to cylinder 10, the tension spring 75 serving to return the semaphore arm in the same manner as above described.

It will be appreciated that the operating means for the semaphore arm may be located at any desired remote position with respect to the semaphore arm assembly, having reference to the particular installation problem in a particular vehicle, and that the driving connection between the operating means and the lower sprocket wheel 61 may be secured through any desired form of flexible coupling means, such as universal joints or a flexible shaft. The chain belts 62 and 63, together with the tension rods 66 and 67 function after the manner of a belt which is "crossed" in the present embodiment to secure the desired direction of rotation of the upper sprocket 63 which carries the semaphore arm 7. It will be appreciated that where the operating means is such as to cause rotation of the shaft 53 in a direction opposite to that shown, the crossing of the tension rods will be omitted. It will further be appreciated that a continuous chain may be provided in place of the chain belts 62—63 and tension rods 66—67, the provision of the tension rods being primarily for the purpose of reducing the expense of construction, inasmuch as the only portions of the system which must necessarily be of a chain structure are those portions which actually engage the sprockets 61 and 63.

Having thus described my invention what I claim as new and desire to secure by Letters Patent is:

1. In a semaphore signal for automobiles; a vertical casing open at one side, a driving shaft, a driven shaft in the upper part of said casing and located substantially in parallelism with said driving shaft above the latter, sprocket wheels on said shafts, a semaphore arm carried by the upper shaft sprocket wheel, an endless chain element trained around said sprocket wheels and having a portion moving downwardly to effect swinging movement of the arm outwardly of the casing, and an arm movement limiting device connecting the downwardly moving portion of said chain element and the arm.

2. In a semaphore signal for automobiles; a vertical casing open at one side, a driving shaft, a driven shaft in the upper part of said casing and located substantially in parallelism with said driving shaft above the latter, sprocket wheels on said shafts, a semaphore arm carried by the upper shaft sprocket wheel, an endless chain element trained around said sprocket wheels and having a portion moving downwardly to effect swinging movement of the arm outwardly of the casing, an arm movement limiting device connecting the downwardly moving portion of said chain element and the arm, and spring means connecting said casing and arm and urging said arm to housed position in the casing.

3. In a vehicle signal indicator including a vertically disposed semaphore casing having a vertically disposed slot in the outwardly disposed face thereof and a semaphore arm pivoted therein near the upper end thereof and adapted to be concealed when in a retracted position within the said casing, a belt mechanism in connection with said arm and a variable stroke vacuum power unit connected with the belt mechanism for actuating the semaphore arm, and an arresting member interposed between said belt mechanism and said semaphore arm and connecting the same together to arrest the outward travel of the semaphore arm when reaching a predetermined position.

4. In a semaphore signal for automobiles; a vertical casing open at one side, a driving shaft, a driven shaft in the upper part of said casing and located substantially in parallelism with said driving shaft above the latter, sprocket wheels on said shafts, a semaphore arm carried by the upper shaft sprocket wheel, an endless chain element trained around said sprocket wheels and having a portion moving downwardly to effect swinging movement of the arm outwardly of the casing, a pair of rods having lapping ends in side-by-side relation and the other ends being pivoted respectively to the arm and the downwardly moving portion of the chain element, the lapping ends being provided with terminal enlargements, and a sleeve surrounding said lapping ends.

5. In a semaphore signal for automobiles; a vertical casing open at one side, a driving shaft, a driven shaft in the upper part of said casing and located substantially in parallelism with said driving shaft above the latter, sprocket wheels on said shafts, a semaphore arm carried by the upper shaft sprocket wheel, an endless chain element trained around said sprocket wheels and having a portion moving downwardly to effect swinging movement of the arm outwardly of the casing, a pair of rods having lapping ends in side-by-side relation and the other ends being pivoted respectively to the arm and the downwardly moving portion of the chain element, the lapping ends being provided with terminal enlargements, a sleeve surrounding said lapping ends, and spring means connecting said casing and arm and urging said arm to housed position in the casing.

VICTOR CRANFORD.